United States Patent [19]

Ash et al.

[11] Patent Number: 6,051,323
[45] Date of Patent: Apr. 18, 2000

[54] MULTILAYER POLYKETONE STRUCTURES

[75] Inventors: Carlton Edwin Ash, Sugar Land; Dixie G. Waters, Houston; Richard L. Danforth, Missouri City, all of Tex.

[73] Assignee: Shell Oil Company, Houston, Tex.

[21] Appl. No.: 09/104,850

[22] Filed: Jun. 29, 1998

Related U.S. Application Data

[60] Provisional application No. 60/068,088, Dec. 18, 1997.

[51] Int. Cl.[7] .................................................. B32B 27/08
[52] U.S. Cl. ........................................ 428/474.4; 528/392
[58] Field of Search ........................... 528/392; 428/474.4

[56] References Cited

U.S. PATENT DOCUMENTS

| | | | |
|---|---|---|---|
| 1,995,291 | 3/1935 | Carothers | 260/54 |
| 2,012,267 | 8/1935 | Carothers | 260/8 |
| 2,130,948 | 9/1938 | Carothers | 18/54 |
| 4,808,699 | 2/1989 | Van Broekhoven et al. | 528/392 |
| 4,868,282 | 9/1989 | Van Broekhoven et al. | 528/392 |
| 4,880,903 | 11/1989 | Van Broekhoven et al. | 528/392 |
| 4,880,904 | 11/1989 | Kinneberg et al. | 528/392 |
| 5,232,786 | 8/1993 | Waters et al. | 428/475.8 |
| 5,300,338 | 4/1994 | Byrd, Jr. et al. | 428/36.6 |
| 5,369,170 | 11/1994 | Weinkauf | 525/64 |

*Primary Examiner*—Terressa M. Boykin

[57] ABSTRACT

Multilayer polyketone compositions are presented. These compositions have at least one layer of polyketone, at least one layer of a polyamide having a lengthy aliphatic chain segment and a tielayer of a polyamide having a short aliphatic chain segment, a polyamide-AABB portion, a polyamide having a lengthy aliphatic chain segment, and preferably residual polyamide monomer. Processes for making these composites are also presented. In another embodiment of the invention, the tielayer is a polyamide monomer.

17 Claims, No Drawings

MULTILAYER POLYKETONE STRUCTURES

This application claims the benefit of U.S. Provisional Application No. 60/068,088, filed Dec. 18, 1997, the entire disclosure of which is hereby incorporated by reference.

BACKGROUND OF THE INVENTION

This invention relates to the production of multilayer polymers structures comprising at least one layer of an alternating aliphatic polyketone and at least one comprising a polyamide having lengthy aliphatic chain segments.

Polymers of carbon monoxide and ethylenically unsaturated hydrocarbons commonly referred to as aliphatic alternating polyketones (hereafter, "polyketones") are now well known. High molecular weight alternating aliphatic polyketones are of considerable interest because they exhibit a good overall set of physical and chemical properties. The tribological and barrier properties of these materials are particularly noteworthy. This class of polymers is disclosed in numerous U.S. patents assigned to Shell Oil Company exemplified by U.S. Pat. Nos. 4,880,903 and 4,880,904 which are incorporated herein by reference.

No single polymer is known to possess properties that are optimal or even desirable for all possible polymer applications. A number of strategies are used to enhance the properties of polymers which may be useful in some respects and less desirable in others. One such approach is the formulation of polymer blends. Blending usually results in a material that has an overall property set that is the average of the materials blended. material that has an overall property set that is the average of the materials blended Another approach is to enhance a polymer's properties through the addition of certain additives. For example, certain stiff polymers may be made flexible by the addition of placticizers. Another strategy that can be used is the formation of a multilayer structure using two or more different polymers. This is frequently seen in packaging applications in which the multilayer structure is comprised of two or more polymers. For example, one polymer layer may provide the necessary chemical barrier characteristics, while benefiting from the lower cost and desired mechanical properties of another.

It would be useful to form composites or multilayer structures from the combination of one or more layers of polyamide-12 (PA-12) together with one or more layers of polyketones. PA-12 finds considerable commercial utility in applications such as industrial hoses, pipes, liners and automotive fuel lines. The barrier properties of monolithic PA-12 structures to materials such as fuels, however, could be substantially improved. This could be affected by preparing the tubing as a composite of PA-12 and polyketone. Unfortunately, PA-12 and polyketone polymers are generally considered to be insufficiently compatible or adhesive. That is, PA-12 will not readily adhere to polyketones after melt processing. Other polyamides of immediate interest which are also generally insufficiently compatible with polyketones include PA-6, PA-11, and PA-6,12.

Compatabilization of the polymer/polymer interface is a critical issue in the formation of composites. Weak interfacial bonding between the layers can result in delamination and poor overall mechanical properties. This can be overcome in some cases through the use of a tielayer between layers to be formed into the composite. Such a tielayer must be compatible or adhesive with the polymers it will join together. Another requirement of the tielayer is that it must be processible under the conditions in which the materials to be joined will be processed. Thermal degradation or crosslinking of the tielayer when exposed to the high processing heat and conditions generally required of polyketone polymers would be counterproductive in most cases. These requirements and others make it difficult to predict which materials might be useful as tielayers for any given set of polymers and make it difficult to engineer useful tielayers and composites.

U.S. Pat. No. 5,369,170 proposes a composite comprising an aminated modified polyolefin and a polyketone. The modified polyolefin can be made by reacting a modified polyolefin such as a maleic anhydride grafted polypropylene with an amine such as a diamine. The method of forming a polyketone/polyolefin layer does not address PAs.

U.S. Pat. No. 5,232,786 proposes a coextruded multilayer structure of polyketone and another layer of a cracked polybutylene or PA-6, PA-12, a copolyetherester, or a polyvinyl chloride. The multilayer structures do not use a tielayer and can consequently be readily separated when the integrity of a layer is stressed or impaired (e.g., by inducing a kink).

U.S. Pat. No. 5,300,338 proposes a coextruded laminate of polyketone and polyvinylidene flouride, PA-6,6, or phenoxy resin. The patent describes at least three different types of adhesion among various bilayer composites. The strongest adhesion was designated "interactive adhesion" and described an adhesion in which the layers could be separated only by destroying one or both of them. The weakest adhesion was designated as a "mechanical bond" in which a composition could be delaminated once the integrity of either layer was impaired. An intermediate level of adhesion was described as a "strong resistance to peel". A bilayer tubing was prepared comprising a polyketone layer and a layer of PA-6,6/PA-12 blend. The tubing displayed an intermediate level of adhesion and was not part of the inventive composition (it was prepared for comparative purposes).

None of the compositions and applications described above teach how one might effectively bond polyketone polymers with PA polymers having lengthy aliphatic chain segments (e.g., PA-12). Improvements in polyketone/PA composites would be beneficial in a number of applications. This could be most directly affected through the use of tielayers which increase the adhesion between the polymer layers.

SUMMARY OF THE INVENTION

The invention is a process for preparing multilayer structures having at least one layer of polyketones and at least one other layer of a PA having a lengthy chain segment. The process comprises the steps of joining the layers together with a tielayer comprising a copolymer of a short aliphatic chain segment, a PA-AABB and/or PA-AB, and a PA with a long aliphatic chain segment. Preferably, the copolymer has residual PA monomer present.

In another aspect of the invention, the tielayer is a copolymer of PA-6, PA-6,6, and PA-12.

In yet another aspect of the invention, PA monomer is used to join PA and polyketone layers.

Another aspect of the invention is a multilayer structure comprising at least one polyketone layer, a PA having a lengthy aliphatic chain segment, and a copolymer of a short aliphatic chain segment, a PA-AABB and/or PA-AB, and a PA with a long aliphatic chain segment. The copolymer preferably has residual PA monomer present and is more preferably a copolymer of PA-6, PA-6,6, and PA-12.

DETAILED DESCRIPTION OF THE INVENTION

The polyketone polymers which are employed in this invention are of an alternating structure and contain substantially one molecule of carbon monoxide followed by one molecule of ethylenically unsaturated hydrocarbon. The portions of the polymer attributable to CO alternates with that attributable to the ethylenically unsaturated hydrocarbon.

It is possible to employ a number of different ethylenically unsaturated hydrocarbons as monomers within the same polymer but the preferred polyketone polymers are copolymers of carbon monoxide and ethylene or terpolymers of carbon monoxide, ethylene and a second ethylenically unsaturated hydrocarbon of at least 3 carbon atoms, particularly an α-olefin such as propene. Additional monomers can also be used and still come within the scope of polyketone polymers described herein. That is, polyketone polymers can be made from four, five, or more combinations of monomers. Such polyketone polymers are aliphatic in that there is an absence of aromatic groups along the polymer backbone. However, alternating polyketones may have aromatic groups substituted or added to side chains and yet still be considered alternating aliphatic polyketones. Moreover, the polyketones used in this invention can be blends with any number of other polymers and materials. Some blends could incorporate aromatic materials and polymers. Nevertheless, the polyketone polymer component is still considered to be of the alternating aliphatic type.

When the preferred polyketone terpolymers are employed, there will be within the terpolymer at least about 2 units incorporating a moiety of ethylene for each unit incorporating a moiety of the second or subsequent hydrocarbon. Preferably, there will be from about 10 units to about 100 units incorporating a moiety of the second hydrocarbon. The polymer chain of the preferred polyketone polymers is therefore represented by the repeating formula

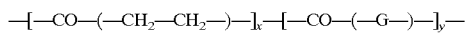

where G is the moiety of ethylenically unsaturated hydrocarbon of at least three carbon atoms polymerized through the ethylenic unsaturation and the ratio of y:x is no more than about 0.5. When copolymers of carbon monoxide and ethylene are employed in the compositions of the invention, there will be no second hydrocarbon present and the copolymers are represented by the above formula wherein y is zero. When y is other than zero, i.e. terpolymers are employed, the —CO—(—CH$_2$—CH$_2$—)— units and the —CO—(—G)— units are found randomly throughout the polymer chain, and preferred ratios of y:x are from about 0.01 to about 0.1. The precise nature of the end groups does not appear to influence the properties of the polymer to any considerable extent so that the polymers are fairly represented by the formula for the polymer chains as depicted above.

Of particular interest are the polyketone polymers of number average molecular weight from about 1000 to about 200,000, particularly those of number average molecular weight from about 20,000 to about 90,000 as determined by gel permeation chromatography. The physical properties of the polymer will depend in part upon the molecular weight, whether the polymer is a copolymer or a terpolymer, and in the case of terpolymers the nature of the proportion of the second hydrocarbon present. Typical melting points for the polymers are from about 175° C. to about 300° C. more typically from about 210° C. to about 270° C. The polymers have a limiting viscosity number (LVN), measured in m-cresol at 60° C. in a standard capillary viscosity measuring device, of from about 0.5 dl/g to about 10 dl/g, more frequently of from about 0.8 dl/g to about 4 dl/g. The backbone chemistry of aliphatic polyketones precludes chain scission by hydrolysis. As a result, they generally exhibit long term maintenance of their property set in a wide variety of environments.

Methods for the production of the polyketone polymers are illustrated by U.S. Pat. Nos. 4,808,699 and 4,868,282 to Van Broekhoven, et. al. which issued on Feb. 2, 1989 and Sep. 19, 1989 respectively and are incorporated herein by reference. U.S. Pat. No. 4,808,699 teaches the production of alternating polymers by contacting ethylene and carbon monoxide in the presence of a catalyst comprising a Group VIII metal compound, an anion of a nonhydrohalgenic acid with a pKa less than 6 and a bidentate phosphorous, arsenic or antimony ligand. U.S. Pat. No. 4,868,282 teaches the production of terpolymers by contacting carbon monoxide and ethylene in the presence of one or more hydrocarbons having an olefinically unsaturated group with a similar catalyst.

The PA polymers which are used as a composite layer to which polyketones are adhered are those PAs having lengthy aliphatic chain segments. A PA with a long aliphatic chain segment is a PA in which a substantial portion of the backbone is comprised of nine or more carbons between amide groups. These polymers include, without limitation, PA-11, PA-12, PA-11,12. PA-11, PA-12 and PA-6,12 are preferred. PA-12 is most preferred. Throughout this specification, Polyamide/"Nylon" polymers are referred to as "PA-X" where X is a number or numbers according to the standard manner of characterizing polyamide repeat units. When the monomers used to form the polyamides are amino acids or lactams, the polyamide is referred to as a PA-AB where A is the amine and B is the carboxyl group. When AB polyamides are referred to, X is a single number designating the number of carbons separating the nitrogen from the carbonyl group. Thus, PA-6 and PA-12 are AB polyamides. When the monomers used to form the PA comprise diamines and dibasic acids, AABB polyamides (PA-AABB) are formed. Two numbers are used to designate X in this case; the first is the number of carbons in the diamine monomer and the second is the number of carbons in the dibasic acid. Thus, PA-6,6 is an AABB polyamide.

The materials useful as the tielayer or adhesive layer include (copolymers of PAs, particularly those having some residual monomer present. By residual monomer, it is meant that the bulk material used as the tielayer has, either grafted or appended thereto, or associated or bonded via physical or chemical means, nitrogenous monomer (or relatively non-polymerized derivitives of the monomer) from which one or more of the PAs which form the copolymers are made. Lactams, acid/diamine combinations, and amino acids ordinarily used in the polymerization of commercial PAs are useful in this regard. Some examples include ε-caprolactam, β-caprolactam, ω-enantholactam, capryllactam, adipic acid/hexamethylenediamine, adipic acid/tetramethylene diamine, ω-dodecanolactam, and ω-aminoundecanoic acid. The lactams are the preferred residual monomers with caprolactams (in particular, ε-caprolactam) being most preferred. One skilled in the art will readily appreciate that other materials exhibiting chemical behavior similar to the lactams can be useful in an equivalent manner.

It is preferred that the residual monomer comprise between about 0.01 and 10% wt based on the total weight of the bulk PA copolymer used as the tie-layer. It is more preferred that between about 1 and 5% wt (same basis) be used. It is most preferred that the residual monomer comprise about 2.5% wt of the bulk material used as the tie-layer.

The copolymeric tielayers include a portion comprising a PA with a short aliphatic chain segment (PA-ABs) such as PA-6, a PA-AABB such as PA-6,6, and a PA with a long aliphatic chain segment such as PA-12. Further, or additional PA segments may also be present, but a terpolymer comprising these particular portions is preferred. A PA with a short aliphatic chain segment is a PA with less than about nine carbons between amide groups. PA-AABBs are PAs which can be derived from diamines and dibasic acids (or the equivalent). Examples include PA-6,6, PA-6,9, and PA-6, 10. PAs with long aliphatic chain segments, in this context, are those PAs having the same characteristics as described above (i.e., nine or more carbons between amide groups). PA-11 and PA-12 are preferred. It is further preferred that the PA with a short chain segment and the PA with a long aliphatic chain segment are both PA-ABs. It also preferred that the copolymeric tielayer is a random copolymer of the three PAs described. However, block copolymers and alternating copolymers can be useful as well.

The most preferred copolymeric tielayer materials are copolymers of PA-6, PA-6,6, and PA-12 having some residual monomer present in the bulk material. These copolymers have between about 40 and 60% mole PA-6, between about 15 and 35% mole PA-6,6, and between about 15 and 35% mole PA-12. It is most preferred that the copolymeric tielayer is a random copolymer comprised of about 45–55% mole PA-6, 20–30% mole PA-6,6, 20–30% mole PA-12, and between about 1 and 3% wt (based on total weight of bulk copolymer) residual monomer. Such materials include, for example, "H-30" Platamid available commercially from Elf Atochem.

The preparation of such nylon copolymers is known. However, if necessary, reference may be found in U.S. Pat. Nos. 1,995,291; 2,012,267; 2,130,948; and many others, as well as in "Polyamide Resins," by Don E. Floyd (Reinhold Publishing Corp., 1966) and *Nylon Plastics*, Edited by Melvin I. Kohan (John Wiley & Sons, 1979) all of which are incorporated herein by reference. It is noteworthy that copolymerization generally involves conventional condensation polymerization requiring, only that the desired monomers, such as diamines, diacids, aminoacids, and lactams, be added to a polymerization vessel sometime during polymerization (provided that the necessary balance of amine and acid group is maintained). It is also possible that a polyamide be transamidized with additional monomer(s) or other polyamide. Residual monomers may be present in the polymer by limiting the polymerization conditions such as time and temperature, providing additional monomer near end of polymerization, or by adding monomer directly to the finished polymer such as in a melt compounding step. All of this will be recognized as conventional by those of ordinary skill in the art.

In another embodiment of this invention, a mutilayer or composite structure is formed by the use of a small amount of PA monomer as an adhesive agent or promoter coated on or compounded in a PA to generate a tielayer for adhering polyketone to a PA with a long aliphatic chain segment. Such PA monomers are the same as those set forth above such as lactams and diamines. Quantities of such monomers useful as tielayer range between about 0.1 and 20% by weight (based on the total weight of PA) added to a PA with a long aliphatic chain segments. A mixture of PA monomers can also be used effectively in this capacity.

Multilayer or composite structures are formed by combining polyketone and PA layers with a tielayer between them, generally at temperatures above the melting point of both the polyketone and PA to which it is adhered. This is best accomplished by coextrusion using well known methods. Generally, this involves extruding the polymers separately and combining them just upstream of the die or within the die used to form the product to be made (e.g., tubing). When the copolymeric tielayer described above is used as the tielayer and PA-12 is the material to which polyketone is adhered, temperatures must generally be maintained above the polymers' melting point which will be between about 100° C. and 280° C. throughout the process. For example, the PK may be extruded at 220–290° C., the PA copolymer tielayer is extruded at temperatures of about 150–190° C. (or, in some cases even higher), and the PA of long aliphatic chain segments is extruded at 170–230° C. The polymer melts are brought together in a multilayer manifold prior to exiting the die. Here the temperature is generally equivalent to the highest of the extruder temperatures. The total residence times can vary from less than one minute to tens of minutes. An important aspect in making good multilayer structures is the utilization of polymers with similar melt viscosities or rheologies. Dramatically different viscosities result in inconsistent flow and uniform thickness. The combinations of materials described above achieve this objective. Those skilled in the art will recognize that many variations of the conditions for this process are possible and that such variations are within the scope of ordinary skill.

Indeed, the multilayer structure of this invention can be made according to any of the processes that are generally useful for adhering different polymeric materials together. In another embodiment of the process of this invention, polyketone and PA-12 layers are formed and adhered together by compression molding with a tielayer placed between the two layers. For example, the polyketone polymer, tielayer, and the PA-12 can be readily molded into 0.3 mm thick sheets at 240–250° C., 190–200° C., and 190–200° C., respectively. The PK/tielayer/PA-12 layers are then compression molded inside a 0.6 mm thick frame using a temperature of about 240° C. to produce a multilayer composite structure.

Multilayer structures comprising any number of layers can be made in the manner described above. Examples include three layer systems of polyketone/tielayer/PA-12 and five layer systems such as polyolefin/tielayer/polyketone/tielayer/PA-12. In the case of the five layer system, the tielayer used to adhere the polyolefin to the polyketone can comprise the amine modified polyolefin described in U.S. Pat. No. 5,369,170 (and incorporated herein by reference) while the tielayer used to adhere the polyketone to the PA-12 comprises the tielayer described throughout this specification.

The multilayer structures of this invention are useful for tubing applications such as as industrial hose, pipes, and liners and automotive fuel lines.

The invention is further described in the following non-limiting examples.

EXAMPLE 1 (Polyketone Formation)

A terpolymer of carbon monoxide, ethene, and propene was produced in the presence of a catalyst composition formed from palladium acetate, the anion of triflouroacetatic acid and 1,3-bis(diphenylphosphino)-propane. The melting point of the linear terpolymer was 220° C. and it had a limiting viscosity number (LVN) of 1.75 measured at 60° C. in m-cresol.

EXAMPLE 2–5 (Coextrusion with Copolymeric Tielayer)

Various combinations of PAs were coextruded with polyketones of Example 1 with and without tielayers. The outerlayer was a PA-12 commercially available from Huls as "VESTAMID" brand PA-12. In examples 2 and 5, the PA-12 was an unplasticized composition sold under the tradename "Vestamid L210". In examples 3 and 4, the PA-12 was a plasticized composition sold under the tradename "Vestamid L2124". The polyketone comprised the inner layer.

The coextrusion was conducted using three single screw extruders (2×38 mm extruders and a 0.25 mm extruder) and a multilayer manifold and tubing die supplied by Geneca. A tubing of nominal outer diameter of 7.5–8.0 mm was produced with layer thicknesses of about 0.35 mm, 0.03 mm, and 0.35 mm for PA-12, tielayer, PK, respectively.

The polyketone was processed at a melt temperature between 250° C. and 255° C. PA was processed at a melt temperature between 205° C. and 210° C. Tielayer was processed at a temperature between 185° C. and 190° C. for "PLATAMID H30" brand PA copolymer, and 270–280° C. for the PA-12/PA-66 blend. The PA-12/PA-66 blend vias prepared on a 25 mm Berstorff twin screw extruder using a 50:50 wt mixture of "ZYTEL 101" brand PA-6,6 from DuPont and "VESTAMID L2124" brand PA-12 from Huls. They were melt processed with a melt temp of about 275–285° C.

A T-peel test was then conducted on the coextruded tubing. In this test, the tubing was sliced open longitudinally. The two main layers were separated on one end slightly by hand to produce two end tabs capable of being placed in an tensile tester. An Instron Model 1123 tensile tester was then used to determine the stress necessary to completely separate the layers at 90° to one another. The test was carried out with acrosshead speed of 127 mm/min. The T-peel adhesion is reported in units of force per unit width of the specimen. Five different samples were pulled for each type of tubing made and the average result was then computed for each type. Results are provided in the Table.

| Example | Middle Layer (Tielayer) | Avg. Peel Strength (N/mm) | Avg. PE/PK Thickness (mm) |
| --- | --- | --- | --- |
| 2 | PA Copolymer[1] | 8.89 | .36/.45 |
| 3 | PA Copolymer[1] | 4.24 | .32/.44 |
| 4[2] | PA-12/PA-6,6[3] | 1.52 | .39/.35 |
| 5[2] | PA-12 | 0.91 | .49/.36 |

Notes:
1. "H-30" Platamid commercially available from Elf AtoChem with a melting point of about 150° C. ca. 50% mol PA-12, 25% mol PA-6,6, 25% mol PA-6 with about 2.5% wt residual caprolactam.
2. Not according to the invention.
3. 50/50 blend (based on total weight of middle layer blend).

This example shows that use of the tielayers of this invention improves adhesion by more than an order of magnitude beyond the adhesion obtained in polyketone/PAs when there is no tielayer according to this invention. This degree of adhesion was unexpected given that it was known that PA-6 and PA-12 adhere rather poorly to polyketone.

EXAMPLE 6 (Compression Molding with Monomeric Adhesion Promoter)

A 15 mil thick, 80×80 mm plaque was made by compression molding the polyketone described in Example 1 at 240° C. on a Pasedena Compression molding press. A plaque of the same dimensions was produced from "VESTAMID L2124" PA-12 from Huls. The 15 mil PA-12 plaque was produced at 195° C. 0.5 grams of caprolactam was evenly spread on the PA-12 sheet. The polyketone sheet was then placed on the PA-12 sheet and compression molded at 240° C. using a 90 sec hold time and 5000 psi pressure (0.752 N/m$^2$) inside a 30 mil thick mold. An attempt was made to conduct a T-Peel test using 25 mm wide strips cut from the placque but adhesion was so strong that tabs could not be initiated for a pull.

This example shows the efficacy of PA monomer as an adhesion promoter.

EXAMPLE 7 (Comparative: Compression Molding without Monomneric Adhesion Promoter)

Example 6 was repeated except that no caprolactam was used. Test strips 25 mm wide were cut and then slightly separated on one end. The separated tabs were placed in a Instron Model 1123 tensile tester. T-peel tests were then conducted using a crosshead speed of 127 mm/min. The sheets could easily be separated by hand and showed T-peel adhesion of 1.12 N/mm.

What is claimed is:

1. A process for producing a multilayer polymer composition comprising adhering at least one layer of polyketone to at least one layer of a PA having a lengthy aliphatic chain segment by contacting both of said layers to a tielayer comprising a copolymer of a PA having a short aliphatic chain segment, a PA-AABB portion, and a PA having, a lengthy aliphatic chain segment.

2. The process of claim 1 wherein said contacting step is conducted by coextrusion.

3. The process of claim 1 wherein said contacting step is conducted by molding.

4. The process of claim 1 wherein the PA layer is selected from the group consisting of PA-11, PA-12, PA-11,12, PA-6,12, and PA-12,12.

5. The process of claim 4 wherein the PA layer is PA-12.

6. The process of claim 1 wherein said tielayer is a copolymer of PA-6, PA-66, and PA-12.

7. The process of claim 1 wherein said tielayer further comprises residual PA monomer.

8. The process of claim 6 wherein said tielayer comprises 40 to 50% mole PA-6, 15 to 35% mole PA-6,6, and about 15 to 35% mole PA-12.

9. The process of claim 7 wherein said tielayer comprises about 40 to 60% mole PA-6, about 15 to 35% mole PA-6,6, about 15 to 35% mole PA-12, and 1 to 5% wt residual PA monomer (based on total weight of the tielayer).

10. A process for producing a multilayer polymer composition comprising adhering at least one layer of polyketone to at least one layer of a PA having a lengthy aliphatic chain segment by contacting both of said layers to an adhesion promoter comprising a PA monomer.

11. The process of claim 10 wherein said PA monomer is selected from the group consisting of lactams, amine/carboxylic acid combinations, and combinations of lactams and amine/carboxylic acid combinations.

12. The process of claim 10 wherein said PA monomer is a caprolactam.

13. The process of claim 10 wherein said PA monomer is selected from the group consisting of ε-caprolactam, β-caprolactam, ω-enantholactam, capryllactam, adipic acid/hexamethylenediamine, adipic acid/tetramethylene diamine, ω-dodecanolactan, ω-aminoundecanoic acid and combinations thereof.

14. A multilayer polymeric structure comprising:
   a) a polyketone layer,
   b) a PA copolymer tielayer, and
   c) a layer comprising a PA having a lengthy aliphatic chain segment, wherein said polyketone layer is bonded to said PA copolymer tielayer and said PA copolymer tielayer is bonded with said PA having a lengthy aliphatic chain segment.

15. A multilayer structure made by combining a polyketone layer, a PA copolymer tielayer, and a PA having a lengthy aliphatic chain segment.

16. A multilayer polymeric structure comprising:
a) a polyketone layer,
b) a PA monomer, and
c) a PA having a lengthy aliphatic chain segment, wherein said polyketone is bonded to said PA monomer and said PA monomer is bonded to said PA having a lengthy aliphatic chain segment.

17. A multilayer structure made by combining a polyketone layer, a PA monomer, and a PA having a lengthy aliphatic chain segment.

* * * * *